United States Patent [19]
Chen

[11] Patent Number: 6,062,279
[45] Date of Patent: May 16, 2000

[54] ADJUSTING DEVICE FOR TENSION ADJUSTMENT OF A TRANSMITTING BELT OF A WOOD PLANING MACHINE

[76] Inventor: Chin-Te Chen, No. 21, Lane 125, Yung-Ho St., Nan Dist., Taichung City, Taiwan

[21] Appl. No.: 09/134,829

[22] Filed: Aug. 17, 1998

[51] Int. Cl.$^7$ ....................................................... B27C 1/02
[52] U.S. Cl. .................................... 144/117.1; 144/114.1; 144/130
[58] Field of Search ............................. 74/63; 144/114.1, 144/117.1, 117.2, 129, 130, 131

[56] References Cited

U.S. PATENT DOCUMENTS

| | | | |
|---|---|---|---|
| 4,394,878 | 7/1983 | Rice et al. ............................. | 144/117.1 |
| 4,886,099 | 12/1989 | Ferreira de Abreu ............... | 144/117.1 |
| 5,176,190 | 1/1993 | Miyamoto et al. ................... | 144/117.1 |

*Primary Examiner*—W. Donald Bray
*Attorney, Agent, or Firm*—Finnegan, Henderson, Farabow, Garrett & Dunner, L.L.P.

[57] ABSTRACT

An adjusting device is provided to adjust adjusting tension of a drive transmitting belt of a wood planing machine, and includes a protective cover and a position adjusting member. The machine has a machine body with a front wall, a drive shaft rotatably mounted on the machine body around a lower axis and extend outboard to the front wall, a motor with an output shaft that extends outboard to the front wall along an upper axis, and a drive transmitting belt trained on the output and drive shafts. The protective cover includes an upright abutting rear wall that extends beyond the output shaft in a transverse direction to the upper axis and that defines an opening to permit forward and outward extension of the output shaft and a transverse movement relative to the opening. The protective cover has left and right anchored points spaced from each other in a diametric direction relative to the opening. The adjusting member has an abutting front wall disposed transverse to the output shaft to abut against the abutting rear wall. The abutting front wall has an opening to permit forward and outward extension of the output shaft, and left and right anchoring points spaced from each other in a diametric direction relative the opening. A guide slot is formed through the left anchoring point in clockwise and counterclockwise directions relative to the opening.

2 Claims, 6 Drawing Sheets

ADJUSTING DEVICE FOR TENSION ADJUSTMENT OF A TRANSMITTING BELT OF A WOOD PLANING MACHINE

BACKGROUND OF THE INVENTION

1. Field of the Invention

The invention relates to an adjusting device, more particularly to an adjusting device for tension adjustment of a drive transmitting belt of a wood planing machine.

2. Description of the Related Art

Referring to FIGS. 1 and 2, a conventional adjusting device for tension adjustment of a drive transmitting belt of a wood planing machine is shown to include a protective cover 11 and a motor support member 12.

As illustrated, the planing machine includes a machine body 10 with a front wall 10F (see FIG. 3), a drive shaft 16 (see FIG. 3) rotatably mounted on the machine body 10 and provided with a coupling end that extends forward and outboard to the front wall 10F, a motor 13 disposed above the machine body 10 and provided with an output shaft 131 that extends forwardly and outboard to the front wall 10F along an upper axis which is parallel to and upwardly spaced from a lower axis defined by the drive shaft 16, and a drive transmitting belt 14 (see FIG. 3) trained on the coupling end of the drive shaft 16 and the output shaft 131 to transmit rotation of the output shaft 131 to the drive shaft 16.

As best shown in FIG. 2, the motor support member 12 includes a horizontal section 12H disposed on the machine body 10 to support the motor 13 thereon, and a vertical section 12V flush with the front wall 10A. The protective cover 11 is mounted on the front wall 10A by means of screws 17, 18, 19, and includes an upright abutting rear wall 111 that extends uprightly beyond the output shaft 131 along a transverse direction to the upper axis, and that is formed with an opening 11A to permit forward and outward extension of the output shaft 131 along the upper axis and a transverse movement of the output shaft 131 relative thereto.

It is noted that at least two persons are needed to adjust the tension of the drive transmitting belt 14. As best illustrated in FIG. 3, in the first step, the screws 17, 18, and 19 are loosened relative to the front wall 10A. Then, an elongated bar 40 is inserted by a first person between the machine body 10 and the motor support member 12 and serves as a fulcrum for lifting the motor 13. A second person must perform the tension adjustment of the transmitting belt 14 and tightening of the screws 17, 17, 19 after setting the tension force of the transmitting belt 14.

SUMMARY OF THE INVENTION

Therefore, the object of this invention is to provide an adjusting device for tension adjustment of a drive transmitting belt of a wood planing machine which is clear of the aforementioned drawback that results from the use of the conventional tension adjusting device described beforehand.

Accordingly, an adjusting device of this invention is adapted for tension adjustment of a drive transmitting belt of a wood planing machine, and includes a protective cover, a position adjusting member, fastening means, and a stabilizing member. The planing machine includes a machine body with a front wall, a drive shaft mounted rotatably on the machine body around a lower axis and provided with a coupling end that extends forwardly and outboard to the front wall, a motor disposed above the machine body with an output shaft that extends forwardly and outboard to the front wall along an upper axis which is parallel to and upwardly spaced from the lower axis, and a drive transmitting belt trained on the coupling end of the drive shaft and the output shaft to transmit rotation of the drive shaft to the drive shaft. The protective cover is adapted to be mounted fixedly on the front wall, and includes an upright abutting rear wall that extends uprightly from the front wall beyond the output shaft in a transverse direction to the upper axis. The abutting rear wall defines a front opening to permit forward and outward extension of the output shaft, as well as a transverse movement of the output shaft relative thereto. The abutting rear wall has left and right anchored points that are spaced apart from each other in a diametric direction relative to the front opening. The position adjusting member is adapted to be mounted fixedly on the motor, and has an abutting front wall disposed transverse to the output shaft to abut against the abutting rear wall. The abutting front wall defines an opening to permit the forward and outward extension of the output shaft, and has left and right anchoring points that are spaced apart from each other in a diametric direction relative to the opening. A guide slot extends from the left anchoring point in both clockwise and counterclockwise directions relative to the opening. The right anchored and anchoring points are aligned to form a pivot axis parallel to the upper axis. The fastening units fasten the left and right anchoring points to the left and right anchored points, respectively. The fastening units are capable of being loosened to permit slidable turning of the abutting front wall of the adjustment member on the abutting rear wall of the protective cover around the pivot axis along the guiding slot, thereby varying the distance between the drive and output shafts so as to adjust tension of the transmitting belt. The stabilizing member is interposed between the abutting front wall of the adjusting member and the protective cover so as to stabilize relative position therebetween when the distance between the drive and output shafts is adjusted.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
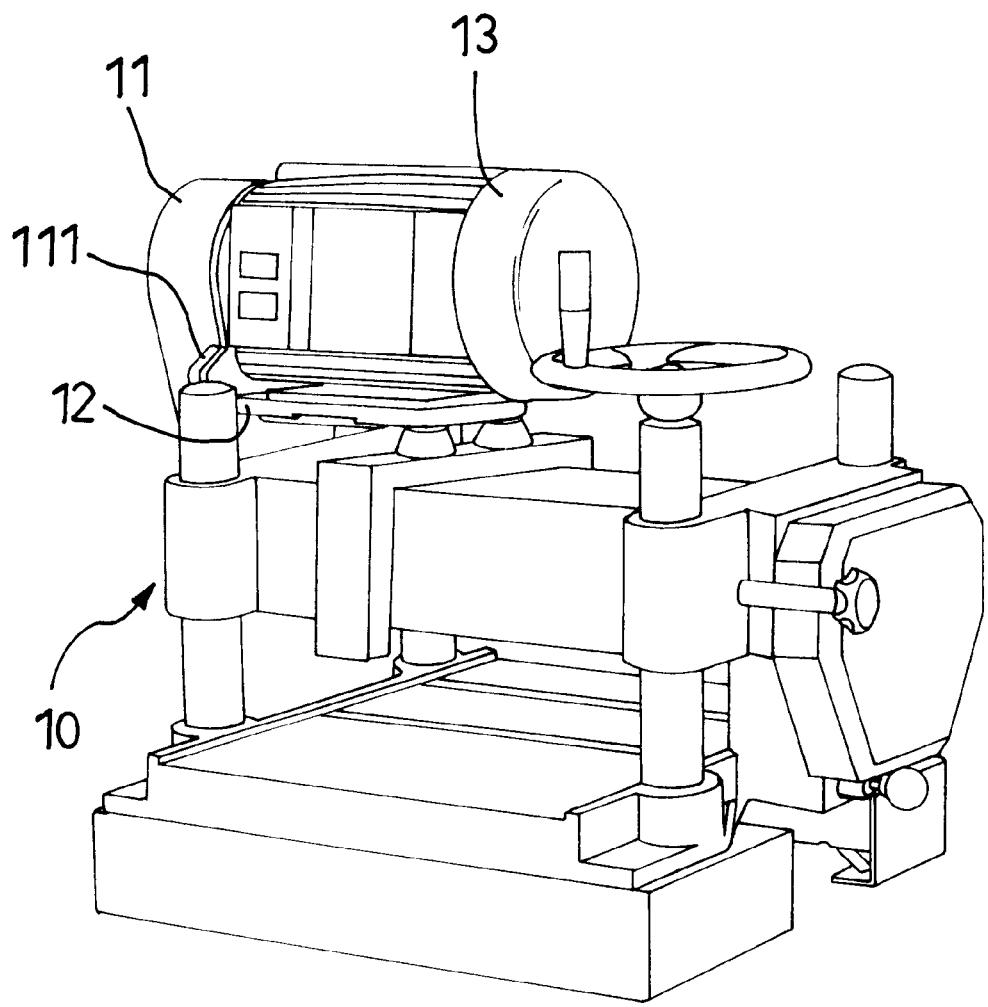
FIG. 1 is a perspective view of a wood planing machine incorporating a conventional adjusting device for tension adjustment of a drive transmitting belt of the wood planing machine.
Figure 2:
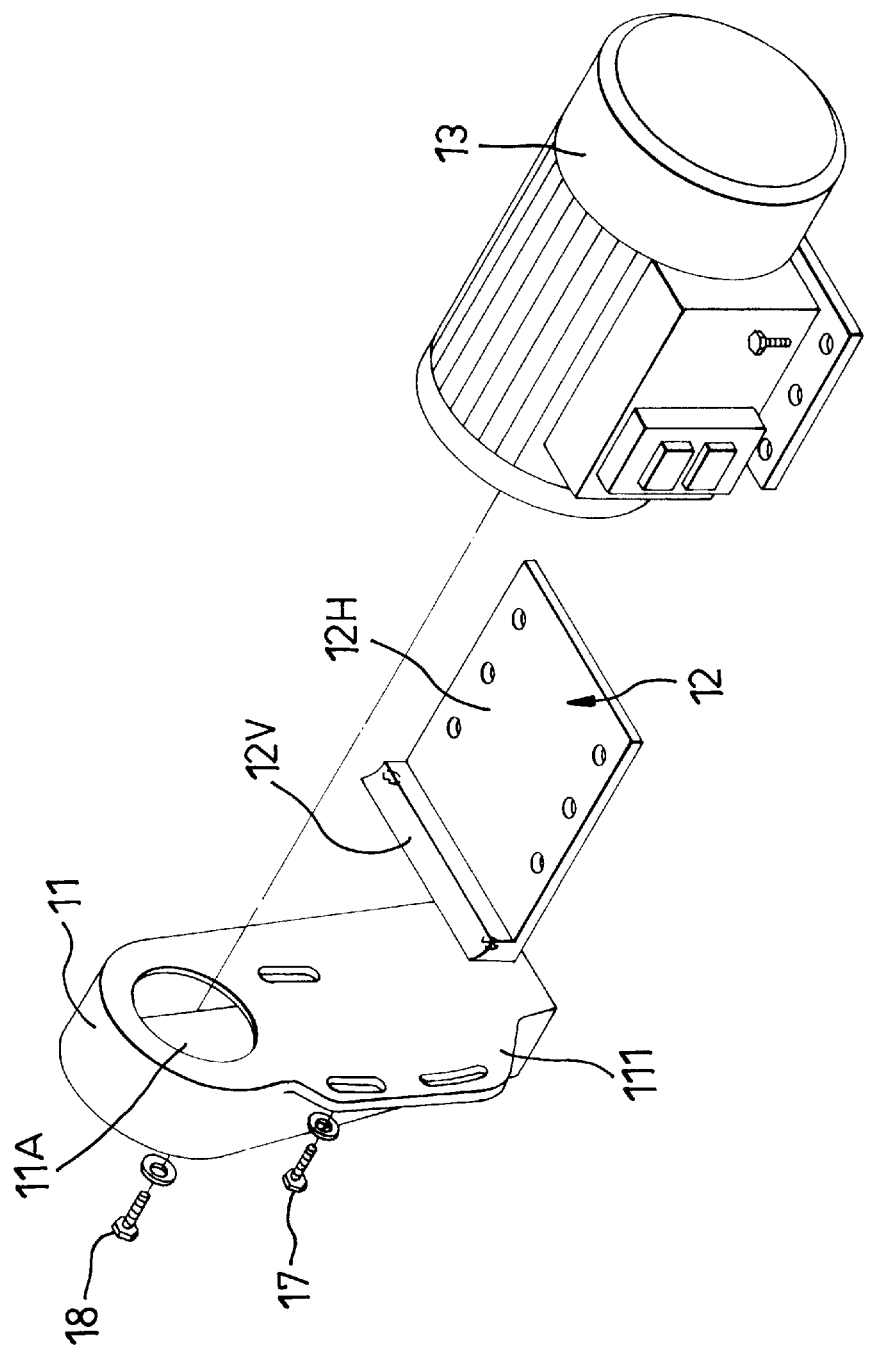
FIG. 2 is an exploded view of the conventional adjusting device shown together with a motor.
Figure 3:
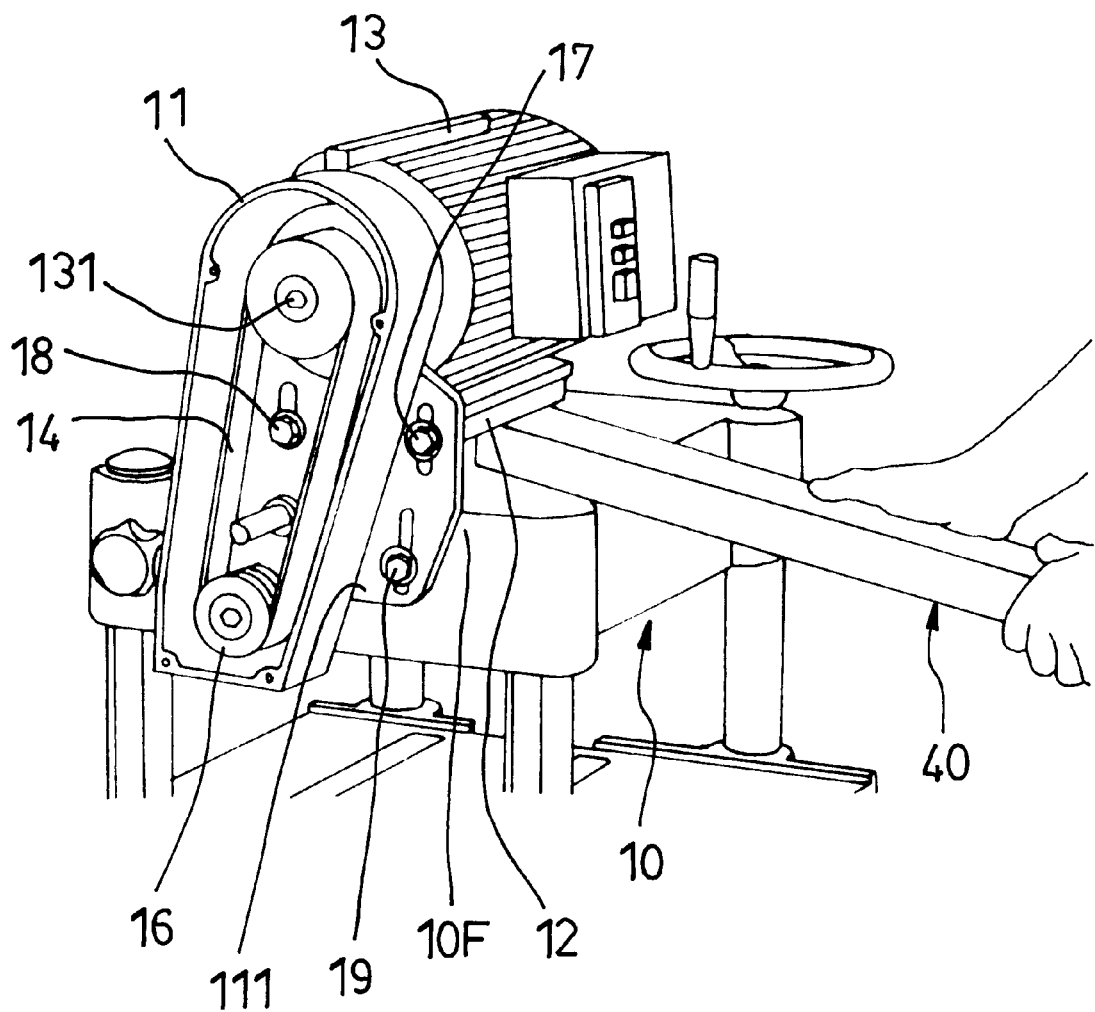
FIG. 3 illustrates how tension adjustment of the drive transmitting belt is performed in the conventional adjusting device of FIG. 1.
Figure 4:
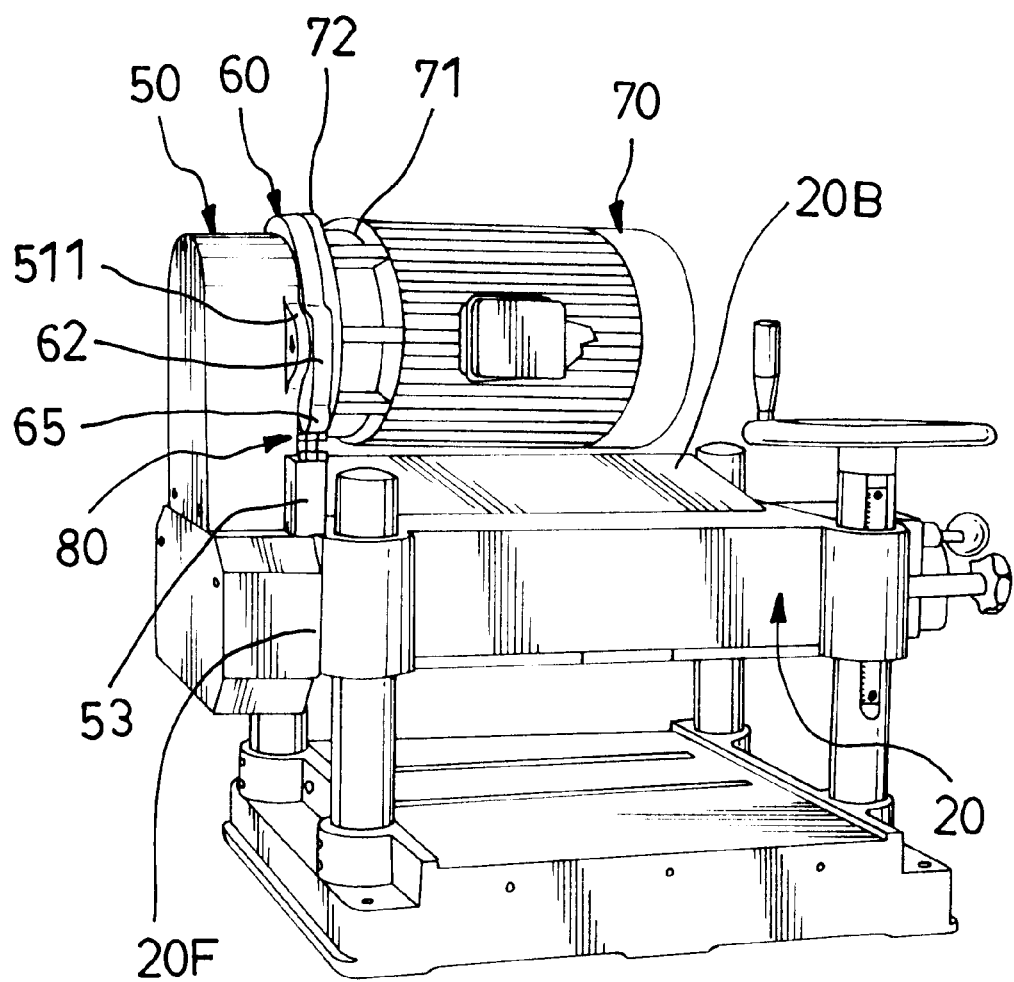
FIG. 4 shows a perspective view of a wood planing machine incorporating the preferred embodiment of an adjusting device of this invention for tension adjustment of a drive transmitting belt of a wood planing machine.
Figure 5:
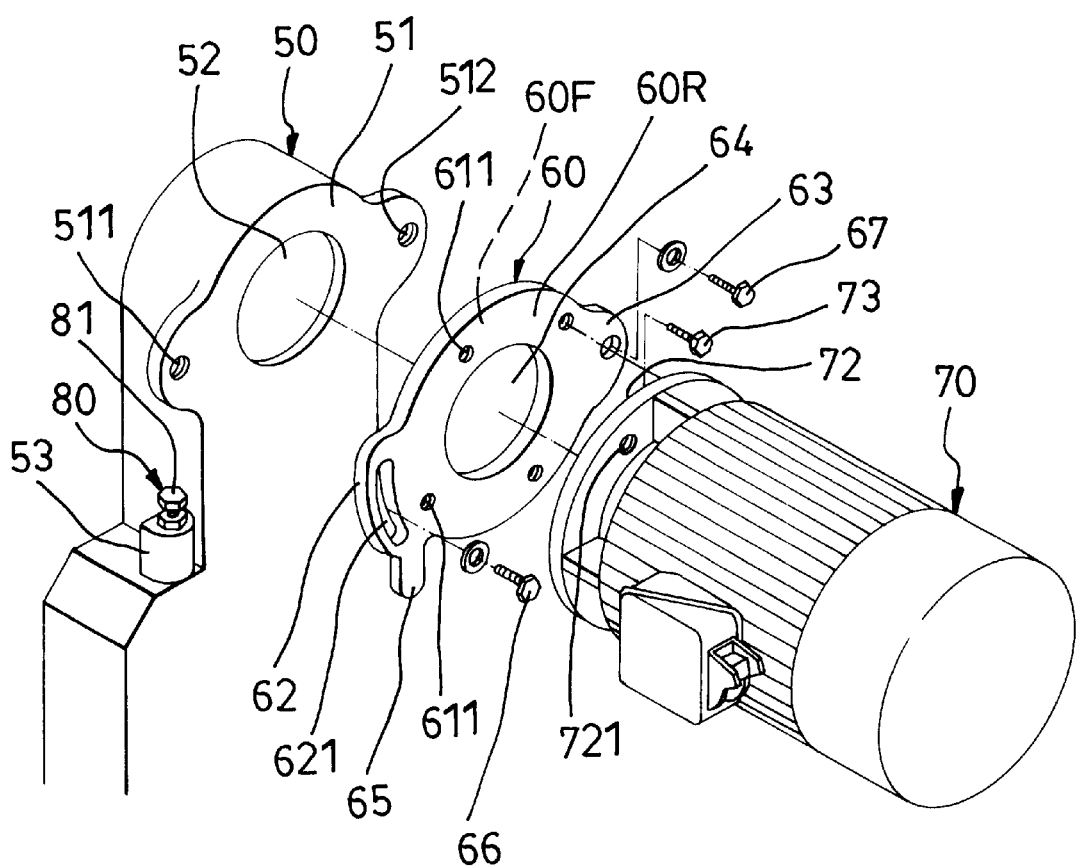
FIG. 5 is an exploded view of the preferred embodiment shown together with a motor.
Figure 6:
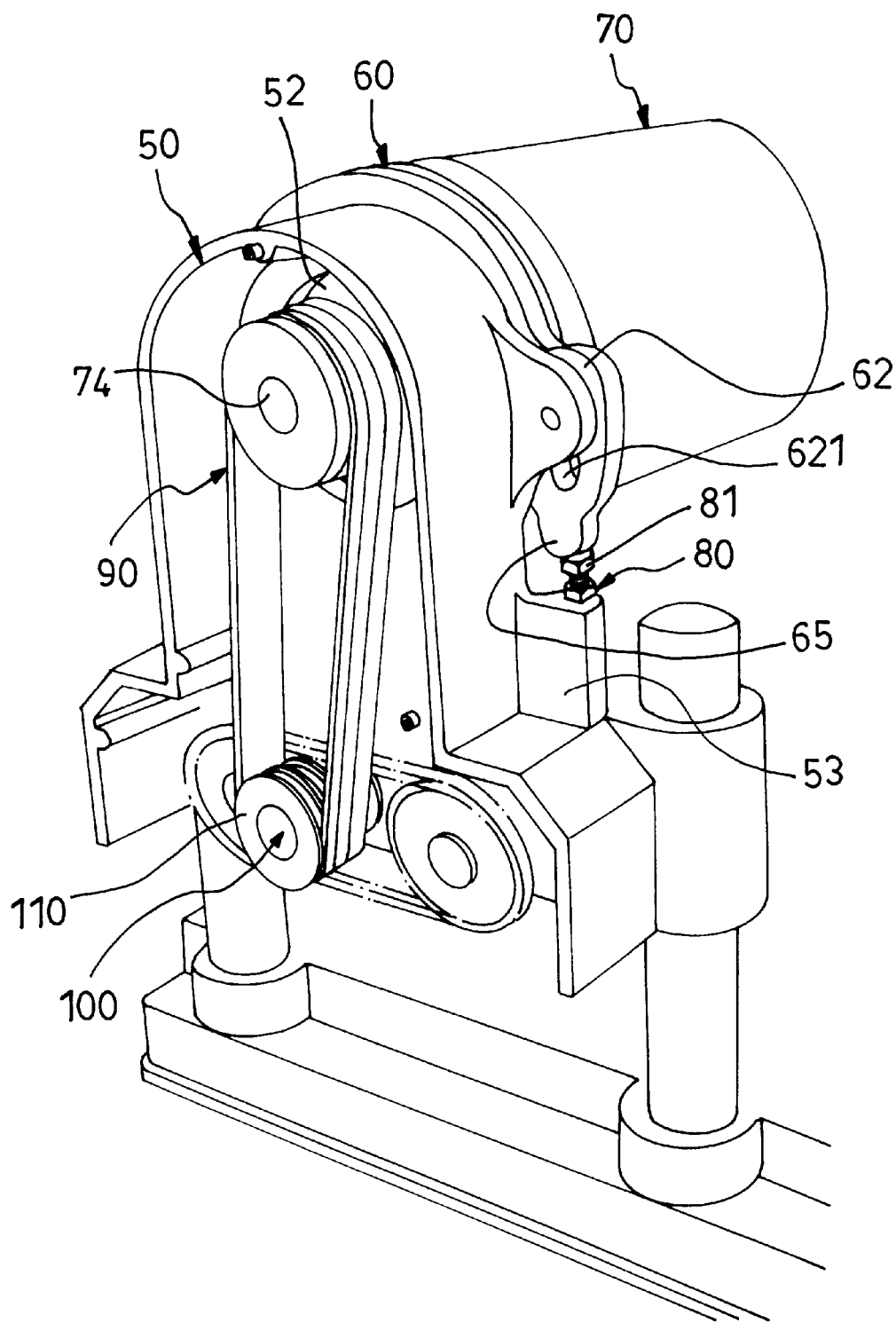
FIG. 6 illustrates how tension adjustment of the drive transmitting belt of the wood planing machine is performed using the preferred embodiment.

Referring to FIGS. 4, 5 and 6, the preferred embodiment of an adjusting device of this invention is adapted for tension adjustment of a drive transmitting belt of a wood planing machine 20, and is shown to include a protective cover 50, a position adjusting member 60, fastening units 66, 67, and a stabilizing member 80.

As illustrated, the wood planing machine 20 includes a machine body 20B with a front wall 20F, a drive shaft 100, a motor 70, and a drive transmitting belt 90. The drive shaft 100 is mounted rotatably on the machine body 20B around a lower axis, and has a coupling end 110 that extends forwardly and outboard to the front wall 20F. The motor 70 is disposed above the machine body 20B, and has an output shaft 74 that extends forwardly and outboard to the front wall 111 along an upper axis which is parallel to and upwardly spaced from the lower axis. The drive transmitting belt 90 is trained over the coupling end 110 of the drive shaft 100 and the output shaft 74 in order to transmit rotation of the output shaft 74 to the drive shaft 100.

The protective cover 50 is adapted to be mounted fixedly on the front wall 20F, and includes an upright abutting rear wall 51 that extends uprightly from the front wall 20F and beyond the output shaft 74 in a transverse direction to the upper axis. The abutting rear wall 51 defines a front opening 52 to permit forward and outward extension of the output shaft 74 as well as a transverse movement of the output shaft 74 relative thereto. The abutting rear wall 51 further has left and right anchored points 511, 512 disposed to be spaced apart from each other in a diametric direction relative to the front opening 51.

The position adjusting member 60 is adapted to be mounted fixedly on the motor 70. The adjusting member 60, formed as a disc-shaped plate, has an abutting front wall 60F disposed transverse to the output shaft 74 to abut against the abutting rear wall 51, and a central opening 64 to permit the forward and outward extension of the output shaft 74. The adjusting member 60 further has left and right anchoring points 62, 63 disposed to be spaced apart from each other in a diametric direction relative the opening 64, and a guide slot 621 that extends from the left anchoring point 62 in both clockwise and counterclockwise directions relative to the opening 64. The right anchored and anchoring points 512,63 are aligned to form a pivot axis parallel to the upper axis.

The fastening units 66, 67 fasten the left and right anchoring points 62, 63 to the left and right anchored points 511, 512, respectively. When the fastening units 66, 67 are loosened, the abutting front wall 60F of the adjusting member 60 can be turned slidably on the abutting rear wall 51 of the protective cover 50 around the pivot axis along the guiding slot 621, thereby varying the distance between the output and drive shafts 74, 100 so as to adjust tension of the drive transmitting belt 90.

The stabilizing member 80 is interposed between the abutting front wall 60F of the adjusting member 60 and the protective cover 50 so as to stabilize relative position therebetween when the distance between the output and drive shafts 74, 100 is adjusted. In the preferred embodiment, the stabilizing member 80 includes a support seat 53 fixed on the protective cover 50 immediately below the left anchoring point 511 and formed with an internally threaded hole, and a threaded bolt 81 threaded in the hole to support a stem 65 which extends integrally and downwardly from the left anchored point 62. 511 thereabove. Movement of the bolt 81 in the threaded hole will result in radial movement of the output shaft 74 relative to the drive shaft 100, thereby achieving tension adjustment of the drive transmitting belt 90.

Preferably, the motor 70 employed in the wood planing machine is provided with an annular flange end 72 that has a plurality of angularly spaced mounting holes 721 aligned with the spaced holes 611 of the adjusting member 60. Fastener screws 73 (only one is shown) extend through the holes 721, 611 to fasten a rear abutment face 60R (see FIG. 5) of the adjustment member 60 on the flange end 72 of the motor 70.

Since tension adjustment of the drive transmitting belt can be accomplished by a single person in the device of this invention, the object of this invention is thus achieved.

With this invention thus explained, it is apparent that numerous modifications and variations can be made without departing from the scope and spirit of this invention. It is therefore intended that this invention be limited only as indicated in the appended claims.

I claim:

1. An adjusting device for tension adjustment of a drive transmitting belt of a wood planing machine, the planing machine including a machine body with a front wall, a drive shaft rotatably mounted on the machine body around a lower axis and having a coupling end that extends forwardly and outboard to the front wall, a motor disposed above the machine body with an output shaft thereof extending forwardly and outboard to the front wall along an upper axis which is parallel to and upwardly spaced apart from the lower axis, and a drive transmitting belt trained on the coupling end and the output shaft so as to transmit rotation of the output shaft to the drive shaft, the adjusting device comprising:

a protective cover adapted to be mounted fixedly on the front wall, said protective cover including an upright abutting rear wall which extends uprightly from the front wall and beyond the output shaft in a transverse direction to said upper axis, which defines a front opening to permit forward and outward extension of the output shaft as well as transverse movement of the output shaft relative thereto, and which has left and right anchored points disposed to be spaced apart from each other in a diametric direction relative to said front opening;

a position adjusting member adapted to be mounted fixedly on the motor, said adjusting member having an abutting front wall which is disposed transverse to the output shaft to abut against said abutting rear wall, which defines an opening to permit the forward and outward extension of the output shaft, and which has left and right anchoring points disposed to be spaced apart from each other in a diametric direction relative to said opening, and a guide slot extending from said left anchoring point in both clockwise and counterclockwise directions relative to said opening, said right anchored and anchoring points being aligned to form a pivot axis parallel to the upper axis;

fastening units for fastening said left and right anchoring points to said left and right anchored points, respectively, said fastening units being capable of being loosened to permit sliable turning of said abutting front wall of said adjusting member on said rear abutting wall of said protective cover around said pivot axis along said guiding slot, thereby varying distance between the output and drive shafts so as to adjust tension of the transmitting belt; and a stabilizing member interposed between said abutting front wall and said protective cover so as to stabilize relative position therebetween when the distance between the output and drive shafts is adjusted.

2. The adjusting device as defined in claim 1, wherein said stabilizing member includes a support seat fixed on said protective cover and immediately below said left anchoring point and formed with an interally threaded hole, and a threaded bolt threaded in said hole to support said left anchoring point thereabove.

* * * * *